Patented Apr. 9, 1929.

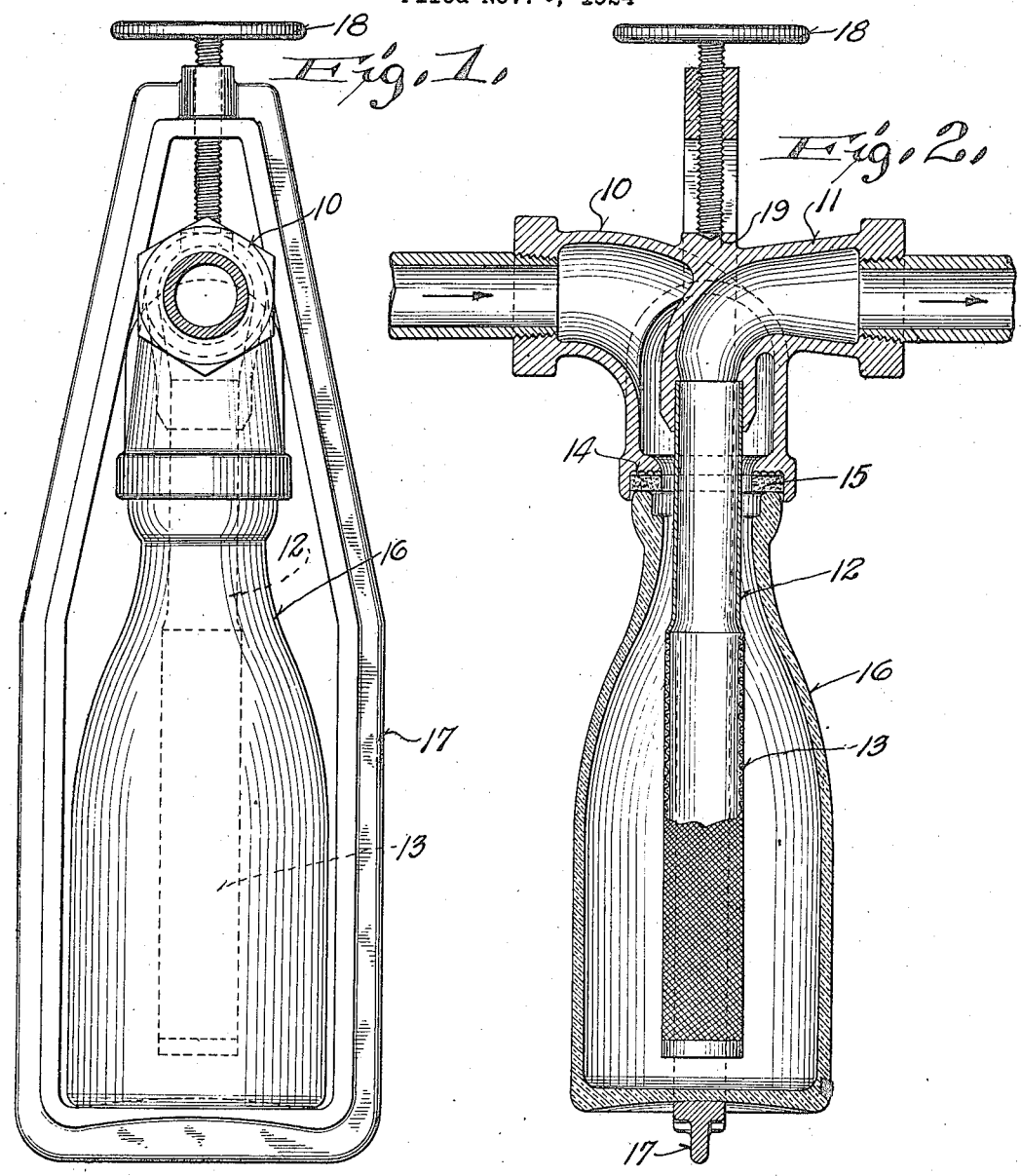

1,708,146

UNITED STATES PATENT OFFICE.

GEORGE J. MEYER, OF MILWAUKEE, WISCONSIN.

FILTER.

Application filed November 5, 1924. Serial No. 747,939.

This invention has for its object to provide a filter particularly designed for use on bottle-washing machines but capable of other uses and adapted to make use of an ordinary bottle as a container whereby the condition of the interior may be observed.

Another object is to provide such a device with the bottle member and strainer removable to make it easily cleaned when occasion requires.

With the above and other objects in view the invention consists in the filter as herein claimed and all equivalents.

Referring to the accompanying drawings, in which like characters of reference indicate the same parts in different views, Fig. 1 is an elevation of the filter constructed in accordance with this invention, and Fig. 2 is a sectional view thereof.

In these drawings, 10 indicates the water inlet of a filter coupling adapted for connection with the water supply pipe, and 11 is a water outlet of said coupling adapted for connection with the bottle-washing machine or other apparatus. The water inlet and water outlet each turn at an angle to form an elbow-like bend with the bend of the water outlet contained within the bend of the water inlet. Removably fitting within the bent end of the water outlet is a strainer tube 12 carrying a strainer 13 preferably constituting a cylinder of brass wire fabric which is closed at its lower end. The downwardly turned mouth at the end of the water inlet 10 forms a bottle mouth seat with a serrated flange 14 making a tight connection with a gasket 15 bearing thereon. An ordinary glass bottle 16, such as a milk bottle, surrounds the downwardly extending strainer and has its mouth seated against the gasket 15 and is clamped in this position by means of a bottle strap clamp 17 which fits against the bottom of the bottle and carries a clamping screw 18 bearing on the center lug 19 of the filter coupling. By tightening the clamping screw 18 the bottle clamp draws the bottle upwardly into tight fitting relation with the gasket 15 so as to be capable of withstanding the water pressure.

The casing for the filter being of clear glass makes the internal condition apparent at all times and the upright position of the bottle causes any loose dirt or foreign matter to settle at the bottom of the bottle where it may accumulate until it is desired to clean the filter. Then by loosening the bottle clamp the bottle is released and the screen is removable.

The filter of this invention is inexpensive to manufacture and maintain, its condition is always apparent, it does not require frequent cleaning, and is easily cleaned when desired.

What I claim as new and desire to secure by Letters Patent is:

A water filter comprising a filter coupling forming oppositely extending elbows one constituting a water inlet passageway and the other constituting a water outlet passageway and terminating in concentrically arranged downwardly extending ends, the end of the outlet passageway being within the end of the inlet passageway, a strainer tube removably fitting the end of the outlet passageway, a bottle-receiving mouth formed on the end of the inlet passageway and provided with a gasketed seat, a glass bottle surrounding the strainer tube and fitting on the gasketed seat of the water inlet passageway, a bottle strap clamp surrounding the filter coupling and the bottle and engaging the bottom of the bottle, and a clamping screw threaded in the clamp and engaging the filter coupling for drawing the bottle against the gasketed seat.

In testimony whereof, I affix my signature.

GEORGE J. MEYER.